United States Patent Office 3,225,029
Patented Dec. 21, 1965

3,225,029
PROCESS FOR THE PREPARATION OF NUCLEO-
SIDES AND PRODUCTS OBTAINED THEREBY
Naotaka Yamaoka, No. 5, 3-Chome, Yoyogi,
Shibuya-ku, Tokyo, Japan
No Drawing. Filed Feb. 28, 1963, Ser. No. 261,889
Claims priority, application Japan, Mar. 8, 1962,
37/8,330
9 Claims. (Cl. 260—211.5)

This invention relates to the novel synthesis of nucleosides and analogous compounds, and particularly it concerns with glycosidation reaction of heterocyclic compounds having an imino group, e.g. purines, pyrimidines and benzimidazoles. More particularly, this invention concerns with a method of preparing purine-, pyrimidine- and benzimidazole-nucleosides through the direct reaction of the heterocyclic compounds as aglycon, with acylglycosyl halides as halogeno-sugar in an organic solvent containing a hydrogen halide acceptor, e.g. metal oxides or weak acid metal salts.

A method of the present invention is adaptable for the synthesis of nucleosides and nucleotides, including adenylic, inosinic and guanylic acids which are known as physiologically important substances. The method further provides the commercially acceptable production of antibiotic puromycin disclosed in J. Am. Chem. Soc. 75, 2025 (1953), vitamin $L_2$ (5'-methylthioadenosine) and amicetin disclosed in J. Am. Chem. Soc. 78, 6216 (1956). The method further provides new substances which are claimed in the invention and which have physiological significance.

Many attempts have been made heretofore in the field of the synthetic procedures for nucleosides and analogous compounds. E. Fischer et al., and J. Davoll et al. disclosed a method for the preparation of nucleosides through the condensation reaction of a halogeno-sugar with the metal salt of a purine or pyrimidine base in a solvent medium. (Cf. Ber. 47, 210 (1914); J. Am. Chem. Soc., 73, 1650 (1951).) T. Sato et al. proposed a method wherein a purine nucleosides is synthesized by fusing a mixture of purine and 1-O-acyl sugar derivatives under reduced pressure in the presence of an acidic catalyst, e.g. p-toluenesulfonic acid or zinc chloride. (Cf. J. Chem. Soc., Japan 81, 1440 (1960).) These prior processes are at a disadvantage because of their poor yield and troublesome procedures.

According to my invention, a novel reaction involved therein assures me of improved yield higher by 20–40% than the conventional processes. The process of the invention allows me to eliminate the step for formation of the metal salt of a purine or pyrimidine base, which step is indispensable in the conventional processes. In addition, the process of my invention which can proceed under a mild condition does not suffer from occurrence of side reactions during desired condensation reaction, and this makes working up of the resulting product easy.

In accordance with the process of my invention, a purine (pyrimidine or benzimidazole base as aglycon and an acylglycosyl halide as halogeno-sugar are brought into condensation reaction in a solvent medium containing a hydrogen halide acceptor. A typical reaction which takes place where the aglycon is purine is represented by the following formulas:

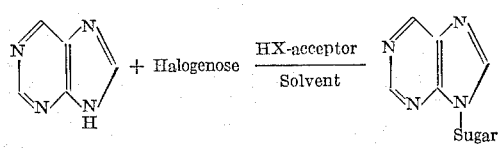

One class of typical aglycons which are suitable starting materials for the present invention includes purine compounds represented by the general formula

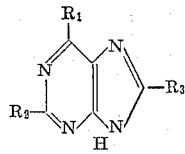

wherein $R_1$ and $R_2$, same or different, is hydrogen or halogen atom, or amino, mono- or di-acylamino, benzoylamino, mono- or di-alkylamino, alkoxy, aryloxy, alkylthio or arylthio radical, and $R_3$ is hydrogen or halogenatom or alkylthio or arylthio radical and X represents halogen. Preferred examples of such purine compounds are mono-, di- and tri-halogenopurines, e.g., 6-chloropurine, 2,6-dichloropurine, 2,6-dibromopurine, 6,8-dichloropurine, 2-methylthio-6-chloropurine, 2,6,8-trichloropurine, etc.; mono- and di-aminopurines, e.g., 6-acetamidopurine, 6-benzamidopurine, 6-dimethylaminopurine, 2-methylthio-6-acetamidopurine, 2-methylthio-6-dimethylaminopurine, 2,6-diacetamidopurine, 2,6-dibenzamidopurine, 2-chloro-6-acetamidopurine, etc.; N-methylpurines, e.g. theophylline, theobromine, etc.; and alkoxypurines, 6-methoxypurine, 2,6-dimethoxypurine, etc.

Another class of typical aglycons is pyrimidine compounds including N-acetyl-cytosine, 2-methylthio-4-chloro-6-pyrimidine, etc. Still another class of typical aglycons is benzimidazole compounds including 5,6-dimethylbenzimidazole.

Suitable acylglycosyl halides as halogeno-sugar which can be reacted with aglycons include the halogenated compounds of ribose, arabinose, xylose, glucose, galactose, mannose or other known pentoses and hexoses and their deoxy-, aminodeoxy-, halogenodeoxy-, alkylthio- or oligosugars, in which compounds their hydroxyl or amino group has been blocked with acyl group. The above-mentioned pentoses or hexoses may be any of five-membered furanose type or six-membered pyranose type. In any cases, however, the amino group of the pentoses or hexoses should be positioned at such a position as forming free hydroxyl group in desired nucleosides.

Illustrative as halogeno-sugars are tri-O-acetyl-D-ribofuranosyl chloride, tri-O-acetyl-D-ribofuranosyl bromide, 3,5-di-O-acetyl-2-deoxy-ribofuranosyl chloride, tri-O-benzoyl - D - ribofuranosyl chloride, 2,5-dibenzoyl-3-acetamido-3-deoxy - D - ribofuranosyl chloride, 2,3-di-O-acetyl-5-deoxy-5-iodoribofuranosyl chloride, 3,5-di-O-benzoyl-2-deoxy-D-ribofuranosyl chloride, 2,3-di-O-acetyl-5-di-O-benzyl-phosphoryl-D-ribofuranosyl bromide, 2,3,5-tri-O-acetyl-D-arabinosyl chloride, 2,3,4,6-tetra-O-acetyl-D-glucopyranosyl bromide, 3,4,6-tri-O-acetyl-2-acetamido-D-glucopyranosyl bromide and so on.

The condensation reaction of the process of the invention should be carried out in a substantially anhydrous, inert organic solvent containing an acceptor for hydrogen halide formed therein. Suitable acceptors include the oxides and weak acid salts of metals of groups I to IV and VIII in the Periodic Table, e.g. silver oxide, silver carbonate, silver cyanide, mercury oxide, mercuric and mercurous cyanides, mercuric and mercurous acetates, cadmium carbonate, cadmium cyanide, potassium cyanide, barium cyanide, zinc cyanide, etc. Particularly suitable hydrogen halide-acceptors are those which are reactive with hydrogen halide without formation of water.

In order to have condensation reaction between an aglycon and a halogeno-sugar completely, the said reaction should be conducted under anhydrous conditions. For this reason, a solvent should preferably be freed from water as by azeotropic distillation prior to its use in reaction. Use of a solvent being capable of forming an azeotropic mixture with water is preferred, because such solvent will serve to take away a small amount of water which may be present in the reaction system. The following solvents will be preferred in the process of the invention: nitromethane, nitroethane, nitrobenzene, n-heptane, toluene, epichlorhydrin, etc. Among these, nitro-hydrocarbons, such as nitromethane and nitroethane, have been found to give most successful results. Such solvents serve to remove water as an azeotropic mixture from the reaction system. These solvents may be used singly or in combination, and besides these, any other solvents, e.g. cyano-hydrocarbons such as acetonitrile, which do not form an azeotrope with water, can be used insomuch as they are inert to both of the aglycon and halogeno-sugar used as reactants.

If necessary, dehydrating agents may be used for the condensation reaction in order to have a completely anhydrous system during the reaction. Conventionally known dehydrating agents, particularly neutral in nature, e.g. anhydrous calcium sulfate, anhydrous magnesium sulfate, anhydrous sodium sulfate, etc. are usable.

With respect to the reaction conditions, there is no particular limitation. Reaction temperatures may vary widely depending on the properties of both reactants to be condensed, but they usually are within the range of from 10° to 140° C. The reactant ratio between an aglycon and a halogeno-sugar may be stoichiometrical, but usually either one of these reactants is used in somewhat excessive amounts than the other. A stoichiometric or slightly excessive amount of the hydrogen halide-acceptor preferably can be used. The solvent heretofore-mentioned should be used in an amount to dissolve at least a part of both reactants, such amount being sufficient to keep the smooth progress of the reaction. The reaction can be carried out at any pressure varying from a reduced pressure to an elevated pressure. Elevated pressures are desirable in case a solvent having a boiling point lower than the required reaction temperature is used.

The reaction mixture thus resulting is subjected to distillation under reduced pressure, whereby the solvent used is removed off. The remaining residue is recrystallized from a suitable solvent, e.g. methanol, ethanol, thereby to give desired product in crystalline form. If the resultant in acylated form is syrup, it should be deacylated by the addition of methanolic ammonia before the recrystallization.

Now the present invention will be mentioned in more detail with reference to the following specific examples, which are informative only and should not be construed as limiting the scope of the invention. All temperatures in these examples are expressed by centigrade.

*Example 1.*—2,6,8-trichloro-9-(2',3',4',6'-tetra-O-acetyl-β-D-glucopyranosyl)-purine A mixture of 6.2 g. of 2,3,4,6-tetra-O-acetyl-glucopyranosyl bromide, 4 g. of silver oxide and 5 g. of anhydrous calcium sulfate (Drierite) was added to a solution of 3.3 g. of 2,6,8-trichloropurine in 100 ml. of nitromethane dried by azeotropic distillation. The mixture was refluxed and stirred for 1 hour under anhydrous condition. The reaction mixture was filtered hot and the filter cake was washed with 10 ml. of hot nitromethane. The filtrate was combined with the washings and the combined solution was evaporated to dryness in vacuo. The residue was obtained as white crystals from ethanol. Recrystallization from ethanol gave 2.2 g. of 2,6,8-trichloro-9-(2',3',4',6'-tetra-O-acetyl-β-D-glucopyranosyl)-purine, M.P. 168°.

The same procedures were repeated without using Drierite and the resultant obtained was 1.1 g.

*Example 2.*—2,6,8-trichloro-9-(2',3',4',6'-tetra-O-acetyl-β-D-glucopyranosyl)-purine A mixture of 6.2 g. of 2,3,4,6-tetra-O-acetyl-glucopyranosyl bromide, 4 g. of mercuric cyanide and 5 g. of anhydrous calcium sulfate (Drierite) was added to a solution of 3.3 g. of 2,6,8-trichloropurine in 100 ml. of nitromethane dried by azeotropic distillation. The mixture was refluxed and stirred for 2 hours under anhydrous condition. The reaction mixture was filtered hot and the filter cake was washed with 10 ml. of hot nitromethane. The filtrate was combined with the washings and the combined solution was evaporated to dryness in vacuo. The residue was obtained as white crystals from ethanol. Recrystallization from ethanol gave 6 g. of 2,6,8-trichloro-9-(2',3',4',6'-tetra-O-acetyl-β-D-glucopyranosyl)-purine, M.P. 168°.

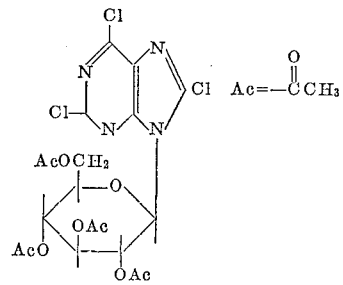

*Example 3.*—2,6,8-trichloro-9-(2',3',4',6'-tetra-O-acetyl-β-D-glucopyranosyl)-purine A mixture of 3.7 g. of 2,3,4,6-tetra-O-acetyl-glucopyranosyl chloride, 2.5 g. of mercuric cyanide and 5 g. of anhydrous calcium sulfate (Drierite) was added to a solution of 2.2 g. of 2,6,8-trichloropurine in 100 ml. of nitromethane dried by azeotropic distillation. The mixture was refluxed and stirred for 3 hours under anhydrous condition. The reaction mixture was filtered hot and the filter cake was washed with 10 ml. of hot nitromethane. The filtrate was combined with washings and the combined solution was evaporated to dryness in vacuo. The residue was obtained as white crystals from ethanol. Recrystallization from ethanol gave 3.7 g. of 2,6,8-trichloro-9 - (2',3',4',6'-tetra-O-acetyl-β-D-glucopyranosyl)-purine, M.P. 168°.

*Example 4.*—2,6,8-trichloro-9-(2',3',4',6'-tetra-O-acetyl-β-D-glucopyranosyl)-purine A mixture of 6.2 g. of 2,3,4,6-tetra-O-acetyl-glucopyranosyl bromide, 4 g. of mercuric cyanide and 5 g. of anhydrous calcium sulfate (Drierite) was added to a solution of 3.3 g. of 2,6,8-trichloropurine in 110 ml. of n-heptane dried by azeotropic distillation. The mixture was refluxed and stirred for 2 hours under anhydrous condition. The reaction mixture was filtered hot and the filter cake was washed with 20 ml. of hot n-heptane. The filtrate was combined with the washings and the combined solution was evaporated to dryness in vacuo. The residue was obtained as white crystals from ethanol. Recrystallization from ethanol gave 0.2 g. 2,6,8-trichloro-9-(2',3',4',6' - tetra - O-acetyl-β-D-glucopyranosyl)-purine, M.P. 168°.

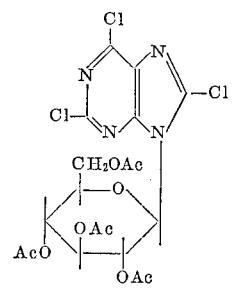

*Example 5.*—2,6,8-trichloro-9-(2',3',4',6'-tetra-O-acetyl-β-D-glucopyranosyl)-purine A mixture of 6.2 g. of 2,3,4,6-tetra-O-acetyl-glucopyranosyl bromide, 4 g. of mercuric cyanide and 5 g. of anhydrous calcium sulfate (Drierite) was added to a solution of 3.3 g. of 2,6,8-trichloropurine in 100 ml. of n-heptane dried by azeotropic distillation. The mixture was refluxed and stirred for 2 hours under anhydrous condition. The reaction mixture was filtered and the filter cake was washed with 20 ml. of hot n-heptane. The filtrate was combined with the washings and the combined solution was evaporated to dryness in vacuo. Recrystallization of the residue from ethanol gave 0.2 g. of 2,6,8-trichloro - 9 - (2',3',4',6'-tetra-O-acetyl-β-D-glucopyranosyl)-purine, M.P. 168°.

*Example 6.*—2,6,8-trichloro-9-(2',3',4',6'-tetra-O-acetyl-β-D-glucopyranosyl)-purine A mixture of 4.1 g. of 2,3,4,6-tetra-O-acetyl-glucopyranosyl bromide and 1.5 g. of silver cyanide was added to the solution of 2.3 g. of 2,6,8-trichloropurine in 100 ml. of nitromethane dried by azeotropic distillation. The mixture was refluxed and stirred for 1 hour under anhydrous condition. The reaction mixture was filtered hot and the filter cake was washed with 10 ml. of hot nitromethane. The filtrate was combined with the washings, and the combined solution was evaporated to dryness in vacuo. The residue was obtained as white crystals from ethanol. Recrystallization from ethanol gave 2.5 g. of 2,6,8 - trichloro-9-(2',3',4',6'-tetra-O-acetyl-β-D-glucopyranosyl)-purine, M.P. 168°.

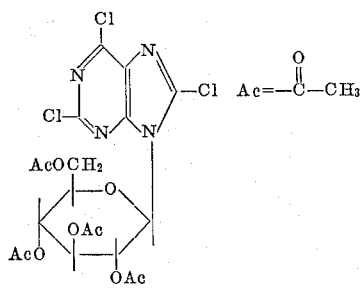

*Example 7.*—2,6,8-trichloro-9-(2',3',4',6'-tetra-O-acetyl-β-D-glucopyranosyl)-purine A mixture of 1.9 g. of 2,3,4,6-tetra-O-acetylglucopyranosyl chloride, 0.6 g. of zinc cyanide and 3 g. of anhydrous calcium sulfate (Drierite) was added to a solution of 1.2 g. of 2,6,8-trichloropurine in 80 ml. of nitromethane dried by azeotropic distillation. The mixture was refluxed and stirred for 3 hours under anhydrous condition. The reaction mixture was filtered hot and the filter cake was washed with 20 ml. of hot nitromethane. The filtrate was combined with the washings and the combined solution was evaporated to dryness in vacuo. Crystallization of the residue from ethanol gave 2,6,8 - trichloro-9-(2',3',4',6'-tetra-O-acetyl-β-D-glucopyranosyl)-purine, M.P. 168°.

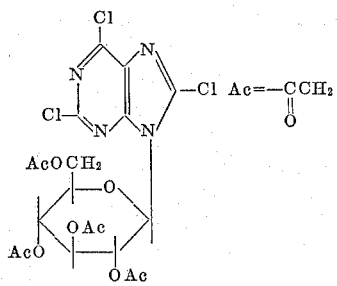

*Example 8.*—2,6,8-trichloro-9-(2',3',4',6'-tetra-O-acetyl-β-D-glucopyranosyl)-purine A mixture of 2.1 g. of 2,3,4,6-tetra-O-acetyl-glucopyranosyl bromide, 1.2 g. of mercuric cyanide and 3 g. of anhydrous calcium sulfate (Drierite) was added to a solution of 1.1 g. of 2,6,8-trichloropurine in 60 ml. of acetonitrile dried by azeotropic distillation with dichloromethane. The mixture was refluxed and stirred for 4 hours under anhydrous condition. The reaction mixture was filtered hot and the filter cake was washed with 20 ml. of hot acetonitrile. The filtrate was combined with the washings and the combined solution was evaporated to dryness in vacuo. Crystallization of the residue from ethanol gave 1.4 g. of 2,6,8-trichloro-9-(2',3',4',6' - tetra - O-acetyl-β-D-glucopyranosyl)-purine, M.P. 168°.

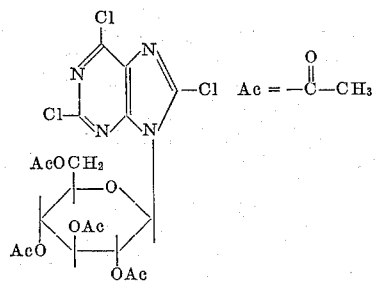

*Example 9.*—2,6,8-trichloro-9-(2',3',4',6'-tetra-O-acetyl-β-D-glucopyranosyl)-purine A mixture of 2.1 g. of 2,3,4,6-tetra-O-acetyl-glucopyranosyl bromide, 0.6 g. of potassium cyanide and 3 g. of anhydrous calcium sulfate (Drierite) was added to a solution of 1.1 g. of 2,6,8-trichloropurine in 80 ml. of nitromethane dried by azeotropic distillation. The mixture was refluxed and stirred for 3 hours under anhydrous condition. The reaction mixture was filtered hot and the filter cake was washed with 20 ml. of hot nitromethane. The filtrate was combined with the washings and the combined solution was evaporated to dryness in vacuo. Crystallization of the residue from ethanol gave 1.3 g. of 2,6,8-trichloro-9-β-D-glucopyranosyl)-purine, M.P. 168°.

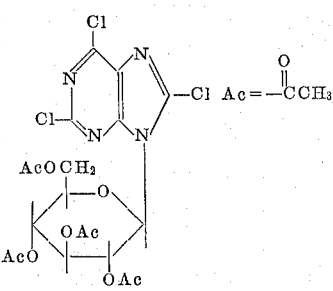

*Example 10.*—2,6,8-trichloro-9-(hepta-O-acetyl-β-gentiobiosyl)-purine

A mixture of 3 g. of hepta-O-acetylgentiobiosyl chloride, 1.2 g. of mercuric cyanide and 3 g. of anhydrous calcium sulfate (Drierite) was added to a solution of 1 g. of 2,6,8-trichloropurine in 50 ml. of nitroethane dried by azeotropic distillation. The mixture was refluxed and stirred for 3 hours under anhydrous condition. The reaction mixture was filtered hot and the filter cake was washed with 10 ml. of hot nitroethane. The filtrate was combined with the washing and the combined solution was evaporated to dryness in vacuo. The residue was obtained as white crystals from ethanol. Recrystallization from ethanol gave 1.6 g. of 2,6,8-trichloro-9-(hepta-O- acetyl-β-gentiobiosyl)-purine, M.P. 157°. *Analysis*—
Calcd. for $C_{31}H_{35}Cl_3N_4O_{17}$: N, 6.66. Found, N, 6.47.

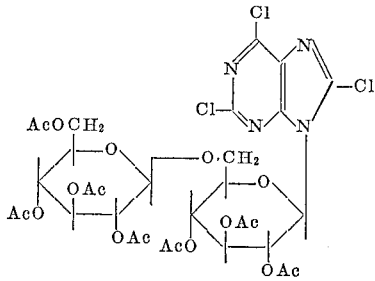

*Example 11.*—2,6,8-trichloro-9-(hepta-O-acetyl-β-D-cellobiosyl)-purine

A mixture of 7 g. of hepta-O-acetylcellobiosyl bromide, 2.6 g. of mercuric cyanide and 6 g. of anhydrous calcium sulfate (Drierite) was added to a solution of 2.2 g. of 2,6,8-trichloropurine in 100 ml. of nitromethane dried by azeotropic distillation. The mixture was refluxed and stirred for 3 hours under anhydrous condition. The reaction mixture was filtered hot and the filter cake was washed with 20 ml. of hot nitro-methane. The filtrate was combined with the washings and the combined solution was evaporated to dryness in vacuo. The residue was obtained as white crystals from ethanol. Recrystallization from ethanol gave 7 g. of 2,6,8-trichloro-9-(hepta-O-acetyl-β-D-cellobiosyl)-purine, M.P. 175°.

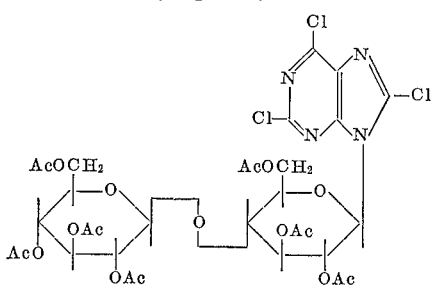

*Example 12.*—2,6,8-trichloro-9-(tri-O-acetyl-β-D-ribofuranosyl)-purine

A mixture of 2,3,5-tri-O-acetylribofuranosyl chloride from 6.5 g. of 1,2,3,5-tetra-O-acetylribofuranose, 5.2 g. of mercuric cyanide and 5 g. of anhydrous calcium sulfate (Drierite) was added to a solution of 4.5 g. of 2,6,8-trichloropurine in 100 ml. of nitromethane dried by azeotropic distillation. The mixture was refluxed and stirred for 3 hours under anhydrous condition. The reaction mixture was filtered hot and the filter cake was washed with 20 ml. of hot nitromethane. The filtrate was combined with the washings and the combined solution was evaporated to dryness in vacuo. The residue was obtained as white crystals from ethanol. Recrystallization from ethanol gave 7 g. of 2,6,8-trichloro-9-(2′,3′,5′-tri-O-acetyl-β-D-ribofuranosyl)-purine, M.P. 166°.

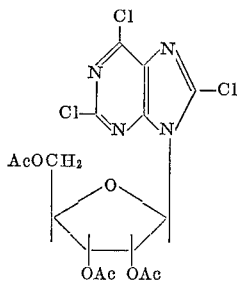

*Example 13.*—6,8-dichloro-9-(2′,3′,4′,6′-tetra-O-acetyl-β-D-glucopyranosyl)-purine A mixture of 1.7 g. of 2,3,4,6-tetra-O-acetylglucopyranosyl bromide, 2 g. of mercuric cyanide and 4 g. of anhydrous calcium sulfate (Drierite) was added to a solution of 0.8 g. of 6,8-dichloropurine in 100 ml. of nitromethane dried by azeotropic distillation. The mixture was refluxed and stirred for 2 hours under anhydrous condition. The reaction mixture was filtered hot and the filler cake was washed with 20 ml. of hot nitrothane. The filtrate was combined with the washings and the combined solution was evaporated to dryness in vacuo. The residue was obtained as white crystals from ethanol. Recrystallization from ethanol gave 0.8 g. of 6,8-dichloro-9-(2′,3′,4′,6′-tetra-O-acetyl-β-D-glucopyranosyl) - purine, M.P. 236°. *Analysis*—Calcd. for $C_{19}H_{20}O_9N_4Cl_2$: N, 10.79. Found: N, 10.77.

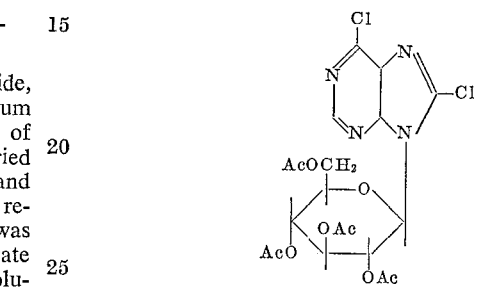

*Example 14*—2,6,-dichloro-9-(2′,3′,4′,6′-tetra-O-acetyl-β-D-glucopyranosyl)-purine A mixture of 6.2 g. of 2,3,4,6-tetra-O-acetylglucopyranosyl bromide, 4.5 g. of mercuric cyanide and 5 g. of anhydrous calcium sulfate (Drierite) was added to a solution of 2.8 g. of 2,6-dichloropurine in 100 ml. of nitromethane dried by azeotropic distillation. The mixture was refluxed and stirred for 2.5 hours under anhydrous condition. The reaction mixture was filtered hot and the filter cake was washed with 10 ml. of hot nitromethane. The filtrate was combined with the washings, and the combined solution was evaporated to dryness in vacuo. The residue was obtained as white crystals from ethanol. Recrystallization from ethane gave 6 g. of 2,6-dichloro-9-(2′,3′,4′,6′-tetra - O - acetyl - β - D - glucopyranosyl)-purine, M.P. 162°. *Analysis.*—Calcd. for $C_{19}H_{20}O_9N_4Cl_2$: N, 10.79. Found: N, 10.94.

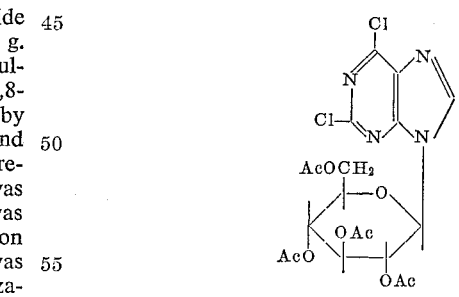

*Example 15.*—2,6-dichloro-9-(2′,3′,5′-tri-O-acetyl-β-D-ribofuranosyl)-purine

A mixture of 2,3,5-tri-O-acetylribofuranosyl chloride prepared from 6.6 g. of 1,2,3,5 - tetra - O - acetyl ribofuranose, 5.5 g. of mercuric cyanide and 5 g. of anhydrous calcium sulfate (Drierite) was added to the solution of 3.8 g. of 2,6-dichlorpurine in 100 ml. of nitromethane dried by azeotropic distillation. The mixture was refluxed and stirred for 4 hours under anhydrous condition. The reaction mixture was filtered hot and the filter cake was washed with 20 ml. of hot nitromethane. The filtrate was combined with the washings and the combined solution was evaporated to dryness in vacuo. The residue was extracted with chloroform. The extract was washed with 30% aqueous potassium iodide and with water, dried over sodium sulfate and evaporated to dryness in vacuo. The residue was obtained as light yellow crystals from ethanol. Recrystallization from ethanol gave 8.5 g. of 2,6-dichloro-9-(2′,3′,5′-tri-O-acetyl-β-D-ribofuranosyl)-purine.

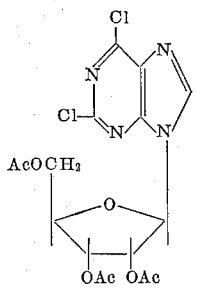

*Example 16.*—6-chloro-9-(2′,3′,4′,6′-tetra-O-acetyl-β-D-glucopyranosyl)-purine

A mixture of 8.2 g. of 2,3,4,6-tetra-O-acetylglucopyranosyl bromide, 3 g. of mercuric cyanide and 5 g. of anhydrous calcium sulfate (Drierite) was added to a solution of 2.9 g. of 6-chloropurine in 100 ml. of nitromethane dried by azeotropic distillation. The mixture was refluxed and stirred for 2.5 hours under anhydrous condition. The reaction mixture was filtered hot and the filter cake was washed with 20 ml. of hot nitromethane. The filtrate was combined with the washings and the combined solution was evaporated to dryness in vacuo. The residue was extracted with chloroform. The extract was washed with 30% aqueous potassium iodide and with water, dried over sodium sulfate, and evaporated to sirup. The sirup was obtained as white crystals from ethanol. Recrystallization from ethanol gave 5.8 g. of 6-chloro-9 - (2′,3′,4′,6′ - tetra - O - acetyl - β - D - glucopyranosyl)-purine, M.P. 168°. *Analysis.*—Calcd. for $C_{19}H_{21}ClN_4O_9$ N, 11.55. Found: N, 11.57.

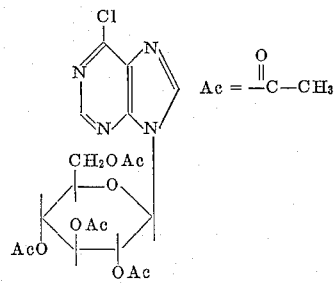

*Example 17.*—6-chloro-9-β-D-*ribofuranosylpurine*

A mixture of 2, 3,5-tri-O-benzoylribofuranozyl chloride (prepared from 10.0 g. of 1-O-acetyl-2,3,5-tri-O-benzoyl-ribofuranose), 5.5 g. of mercuric cyanide and 6 g. of anhydrous calcium sulfate (Drierite) was added to the solution of 3.1 g. of 6-chloropurine in 100 ml. of nitromethane dried by azeotropic distillation. The mixture was refluxed and stirred for 4 hours under anhydrous condition. The reaction mixture was filtered hot and the filter cake was washed with 20 ml. of hot nitromethane. The filtrate was combined with the washings and the combined solution was evaporated to dryness in vacuo. The residue was extracted with chloroform. The liquid extract was washed with 30% aqueous potassium iodide and then with water, dried over anhydrous sodium sulfate and then filtered. The filtrate was evaporated to dryness in vacuo. A solution of the residue in 50 ml. of methanol was treated with 50 ml. of methanolic ammonia (saturated at 0°), kept overnight at 3°, and evaporated to dryness. Crystallization of the residue from water gave 3.5 g. of 6-cholor-9-(β-D-ribofuranosy)-purine, M.P. 180°.

By the same method, condensation of 6-chloropurine with 2,3,5 - tri - O - acetylribofuranosyl chloride gave 6-chloro-9-β-D-ribofuranosyl-purine.

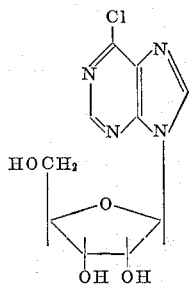

*Example 18.*—Adenosine

A mixture of 2,3,5-tri-O-acetylribofuranosyl chloride (prepared from 3.3 g. of 1,2,3,5-tetra-O-acetylribofuranose), 2.7 g. of mercuric cyanide and 5 g. of anhydrous calcium sulfate (Drierite) was added to the solution of 1.7 g. of 6-acetamidopurine in 300 ml. nitromethane dried by azeotropic distillation. The mixture was refluxed and stirred for 4 hours under anhydrous condition. The reaction mixture was filtered hot and the filter cake was washed with 20 ml. of hot nitromethane. The filtrate was combined with the washings and the combined solution was evaporated to dryness in vacuo. The residue was extracted with chloroform. The extract was washed with 30% aqueous potassium iodide and with water, dried over sodium sulfate, and evaporated to dryness in vacuo. A solution of this residue in 30 ml. of methanol was treated with 30 ml. of methanolic ammonia (saturated at 0°), kept overnight at 5°, and evaporated to dryness. Crystallization of the residue from water gave 1.5 g. of adenosine.

By the same method, the condensation of 6-benzamidopurine (or 6-acetaminopurine) with 2,3,5-tri-O-acetylribofuranosyl chloride, 2,3,5-tri-O-acetylribofuranosylbromide and 2,3,5-tri-O-benzoylribofuranosylchloride respectively gave adenosine in good yield.

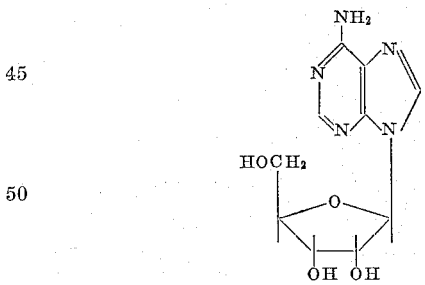

*Example 19.*—6-benzamido-9-(2′,3′,4′,6′-tetra-O-acetyl-β-D-glucopyranosyl)-purine A mixture of 2.9 g. of 2,3,4,6-tetra-O-acetylglucopyranosyl bromide, 3 g. of mercuric cyanide and 5 g. of anhydrous calcium sulfate (Drierite) was added to a solution of 2.4 g. of 6-benzamidopurine in 200 ml. of nitromethane dried by azeotropic distillation. The mixture was refluxed and stirred for 3 hours under anhydrous condition. The reaction mixture was filtered hot, and the filter cake was washed with 20 ml. of hot nitromethane. The filtrate was combined with the washings and the combined solution was evaporated to dryness in vacuo. The residue was extracted with 300 ml. of chloroform. The extract was washed with 30% aqueous potassium iodide and with water, dried over sodium sulfate, and evaporated to sirup. The sirup was obtained as white crystals from ethanol. Recrystallization from ethanol gave 3.0 g. of 6 - benzamido - 9 - (2′,3′,4′,6′ - tetra - O - acetyl - β - D-glucopyranosyl)-purine, M.P. 171°. *Analysis.* — Calcd. for $C_{26}H_{27}O_{10}N_5$: N, 12.29. Found: N, 12.19.

By the same method, the condensation of 6-acetamidopurine with 2,3,4,6-tetra-O-acetylglucopyranosyl bromide gave 6-acetamido-9-(2′,3′,4′,6′-tetra-O-acetyl-β-D-glucopyranosyl)-purine.

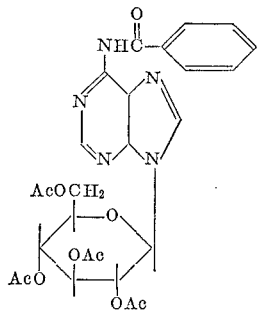

*Example 20.*—2,6-diacetamido-9-(2′,3′,4′,6′-tetra-O-acetyl-β-D-glucopyranosyl)-purine A mixture of 4.2 g. of 2,3,4,6-tetra-O-acetylglucopyranosyl bromide, 2.5 g. of mercuric cyanide and 5 g. of anhydrous calcium sulfate (Drierite) was added to a solution of 2.3 g. of 2,6-diacetamidopurine in 200 ml. of nitromethane dried by azeotropic distillation. The mixture was refluxed and stirred for 3 hours under anhydrous condition. The reaction mixture was filtered hot and the filter cake was washed with 20 ml. of hot nitromethane. The filtrate was combined with the washings and the combined solution was evaporated to dryness in vacuo. The residue was obtained as white crystals from ethanol. Recrystallization from ethanol gave 4.0 g. of 2,6-diacetamido-9-(2′,3′,4′,6′-tetra - O - acetyl - β - D-glucopyranosyl)-purine, M.P. 177°.

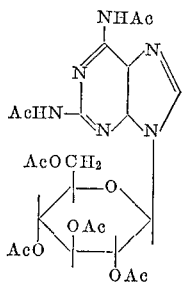

*Example 21.*—9-(5′-deoxy-5′-methylthio-β-D-ribofuranosyl)-adenine

A mixture of 2,3-di-O-acetyl-5-deoxy-5-methylthioribofuranosyl chloride prepared from 3.1 g. of 1,2,3-tri-O-acetyl-5-deoxy-5-methylthioribofuranose, 2.7 g. of mercuric cyanide and 5 g. of anhydrous calcium sulfate (Drierite) was added to the solution of 1.7 g. of 6-acetamidopurine in 300 ml. of nitromethane dried by azeotropic distillation. The mixture was refluxed and stirred for 4 hours under anhydrous condition. The reaction mixture was filtered hot and filter cake was washed with 20 ml. of hot nitromethane. The filtrate was combined with the washings and evaporated to dryness in vacuo. The residue was extracted with 300 ml. of chloroform. The extract was washed with 30% aqueous potassium iodide and with water, dried over sodium sulfate and evaporated to dryness in vacuo. A solution of this residue in 30 ml. of methanol was treated with 30 ml. of methanolic ammonia (saturated at 0°), kept overnight at 5°, and evaporated to dryness in vacuo. Crystallization of the residue from water gave 1.5 g. of 9-(5′-deoxy-5′-methylthio-β-D-ribofuranosyl)-adenine, M.P. 205°.

By the same method, the condensation of 6-benzamidopurine with 2,3-di-O-acetyl - 5 - deoxy-5-methylthioribofuranosyl bromide (or 2,3-di-O-benzoyl-5-deoxy-5-methylthioribofuranosyl bromide) gave 9-(5′-deoxy-5′-methylthio-β-D-ribofuranosyl)-adenine.

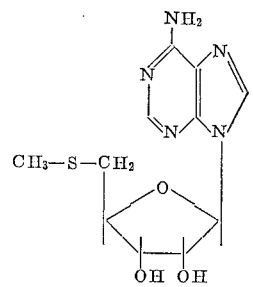

*Example 22.*—6-benzamido-9-(2′,3′-di-O-acetyl-5′-deoxy-5′-iodo-β-D-ribofuranosyl)-purine A mixture of 2,3-di-O-acetyl-5-deoxy-5-iodoribofuranosyl bromide prepared from 4.0 g. of 1,2,3-tri-O-acetyl-5-deoxy-5-iodoribofuranose, 2.7 g. of mercuric cyanide and 5 g. of anhydrous calcium sulfate was added to the solution of 4.4 g. of 6-benzamidopurine in 400 ml. of nitromethane dried by azeotropic distillation. The mixture was refluxed and stirred for 3 hours under anhydrous condition. The reaction mixture was filtered hot and filter cake was washed with 20 ml. of hot nitromethane. The filtrate was combined with the washings and the combined solution was evaporated to dryness in vacuo. The residue was extracted with 300 ml. of chloroform. The extract was washed with 30% aqueous potassium iodide and with water, dried over sodium sulfate, and evaporated to dryness in vacuo, giving 4.9 g. of 6-benzamido-9(2′,3′-O-acetyl - 5′ - deoxy-5′-iodo-β-D-ribofuranosyl)-purine.

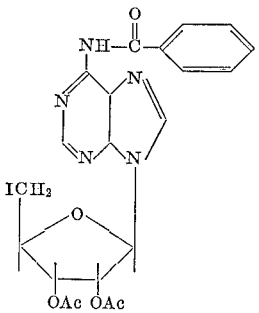

*Example 23.*—2-methylthio-6-dimethylamino - 9-(2′,5′-di-O-benzoyl-3′-deoxy - 3′-acetamido-β-D-ribofuranosyl)-purine A solution of 0.34 ml. of titanium tetrachloride in 5 ml. of ethylene dichloride was added to a solution of 1 g. of 1-O-acetyl-2,5-di-O-benzoyl-3-deoxy-3-acetamidoribofuranose in 9 ml. of ethylene dichloride, and the mixture was refluxed for 1 hour. A mixture of 0.6 g. of mercuric cyanide, 2 g. of anhydrous calcium sulfate (Drierite) and 0.4 g. of 2-methylthio-6-dimethylaminopurine in 100 ml. of nitromethane dried by azeotropic distillation was added to the reaction mixture of ethylene dichloride. The ethylene dichloride was evaporated from the mixture, which was refluxed and stirred for 10 hours under anhydrous condition. The reaction mixture was washed with 50 ml. of water and filtered. The filter cake was washed with chloroform. The filtrate was combined with the washings of chloroform and the combined solution was dried over anhydrous sodium sulfate. The dried combined solution was filtered and the filtrate was evaporated to dryness in vacuo. The residue was extracted with 30 ml. of chloroform. The extract was washed with 25 ml. of 30% aqueous sodium bicarbonate and with water, dried over magnesium sulfate and treated with active carbon. The filtrate was evaporated to dryness, giving 1.3 g. of 2-methylthio-6-dimethylamino-9-(2′,5′-di- O-benzoyl-3'-deoxy-3'-acetamido-β-D-ribofuranosyl)-purine.

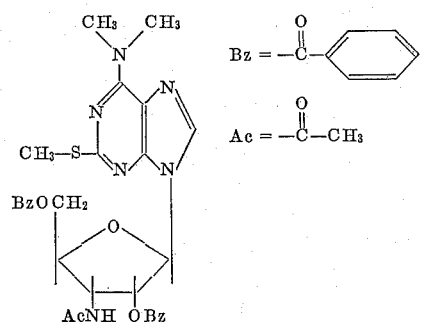

*Example 24.*—6-chloro-9-(2',5'-di-O-benzoyl-3'-deoxy-3'-phthalimido-β-D-ribofuranosyl-purine A mixture of 11.9 g. of 2,5-di-O-benzoyl-3-deoxy-3-phthalimido-D-ribofuranosyl chloride, 7 g. of mercuric cyanide and 5 g. of anhydrous calcium sulfate (Drierite) was added to the solution of 3.8 g. 6-chloropurine in 150 ml. of nitromethane dried by azeotropic distillation. The mixture was refluxed and stirred for 5 hours under anhydrous condition. The reaction mixture was filtered hot and the filter cake was washed with 10 ml. of hot nitromethane. The filtrate was combined with the washings and the combined solution was evaporated to dryness in vacuo. The residue was extracted with chloroform. The extract solution was washed with 30% aqueous potassium iodide and with water, dried over anhydrous sodium sulfate and then filtered. The filtrate was evaporated to dryness in vacuo, giving 13.5 g. of the crude product. Recrystallization of the crude product from ethyl acetate-hexane was obtained 8 g. of 6-chloro-9-(2',5'-di-O-benzoyl-3'-deoxy-3'-phthalimido-β-D-ribofuranosyl)-purine.

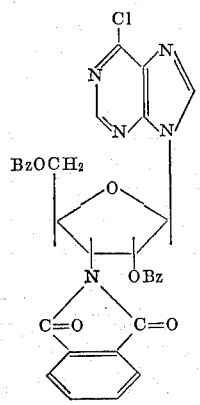

*Example 25.*—7-(2',3',4',6'-tetra-O-acetyl-β-D-glucopyranosyl)-theophylline

A mixture of 4.2 g. of 2,3,4,6-tetra-O-acetyl-glucopyranosyl bromide, 2.7 g. of mercuric cyanide and 5 g. of anhydrous calcium sulfate (Drierite) was added to a solution of 1.8 g. of theophylline in 100 ml. of nitromethane dried by azeotropic distillation. The mixture was refluxed and stirred for 3 hours under anhydrous condition. The reaction mixture was filtered hot and the filter cake was washed with 20 ml. of hot nitromethane. The filtrate was combined with the washings, and the combined solution was evaporated to dryness in vacuo. The residue was obtained as white crystals from ethanol. Recrystallization from ethanol gave 3.7 g. of 7-(2',3',4',6'-tetra-O-acetyl-β-D-glucopyranosyl)-theophylline, M.P. 167°.

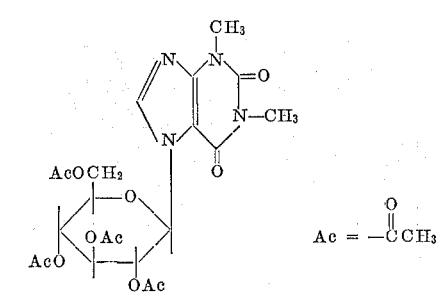

*Example 26.*—6-benzamido-9-(2',3'-di-O-benzoyl-5'-di-p-nitrophenylphosphoryl-β-D-ribofuranosyl)-purine.

A mixture of 2,3-di-O-benzoyl-5-di-p-nitrophenylphosphorylribofuranosyl bromide prepared from 7.0 g. of methyl 2,3-di-O-benzoyl-di-p-nitrophenylphosphorylribofuranoside, 2.5 g. of mercuric cyanide and 5 g. of anhydrous calcium sulfate (Drierite) was added to the solution of 2.4 g. of 6-benzamido-purine in 100 ml. of nitromethane dried by axeotropic distillation. The mixture was refluxed and stirred for 3 hours under anhydrous condition. The reaction mixture was filtered hot and filter cake was washed with 10 ml. of hot nitromethane. The filtrate was combined with the washings and the combined solution was evaporated to dryness in vacuo. The residue was extracted with chloroform. The extract was washed with 30% aqueous potassium iodide and with water, dried over sodium sulfate, and evaporated to dryness in vacuo, leaving 4.8 g. of crude 6-benzamido-9-(2',3'-O-benzoyl-5'-di-p-nitrophenyl-phosphoryl-β-D-ribofuranosyl)-purine.

By the same method, the condensation of N-acetylcytosine with 2,3,4-tri-O-acetyl-6'-diphenylphosphorylglucopyranosyl bromide gave 1-(2',3',4'-tri-O-acetyl-6'-di-phenylphosphoryl-β-D-glucopyranosyl)-4-acetamido-2(1H)-pyrimidine.

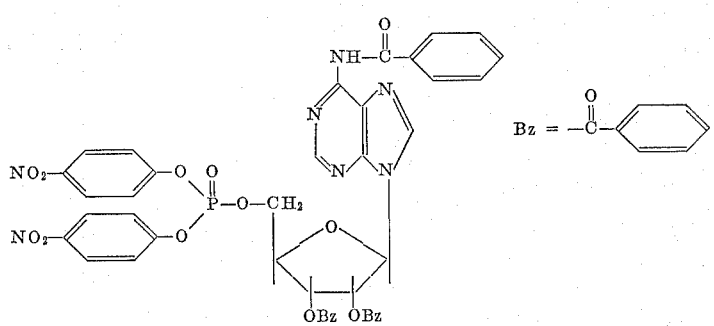

*Example 27.*—1-(2′,3′,4′,6′-tetra-O-acetyl-β-D-glucopyranosyl)-4-acetamido-2(1H)-pyrimidone A mixture of 4.2 g. of 2,3,4,6-tetra-O-acetylglucopyranosyl bromide, 2.6 g. of mercuric cyanide and 5 g. of anhydrous calcium sulfate (Drierite) was added to the solution of 1.5 g. of N-acetylcytosine in 100 ml. of nitromethane dried by azeotropic distillation. The mixture was refluxed and stirred for 3 hours under anhydrous condition. The reaction mixture was filtered hot and the filter cake was washed with 10 ml. of hot nitromethane. The filtrate was combined with the washings and the combined solution was evaporated to dryness in vacuo. The crystallization of the residue from ethanol gave 2.5 g. of 1-(2′,3′,4′,6′-tetra-O-acetyl-β-D-glucopyranosyl)-4-acetamido-2-(1H)-pyrimidone.

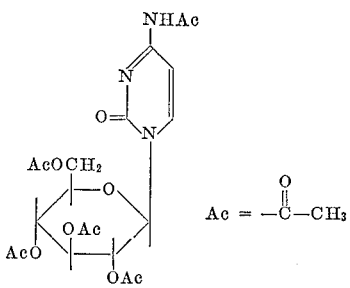

*Example 28.*—1-glycosyl benzimidazoles

A mixture of 2,3,4,6-tetra-O-acetylglucopyranosyl chloride or 2,3,5-tri-O-acetylribofuranosyl chloride with 2.5 g. of mercuric cyanide and 5 g. of anhydrous calcium sulfate (Drierite) was added to a solution of 1.2 g. of benzimidazole in 100 ml. of nitromethane dried by azeotropic distillation. The mixture was refluxed and stirred for 3 hours under anhydrous condition. The reaction mixture was filtered hot and the filter cake was washed with 20 ml. of hot nitromethane. The filtrate was combined with washings and the combined solution was evaporated to dryness in vacuo, and extracted with cold chloroform. The extract was washed with 30 percent aqueous potassium iodide and with water, then dried over sodium sulfate and evaporated under reduced pressure to a sirup. The sirup was dissolved in methanol and then treated with an excess of methanolic ammonia formed by saturation of methanol with ammonia at 0°. The solution was refrigerated overnight and then evaporated to dryness. The residual glycosyl benzimidazole was then crystallized from water or dilute aqueous ethanol.

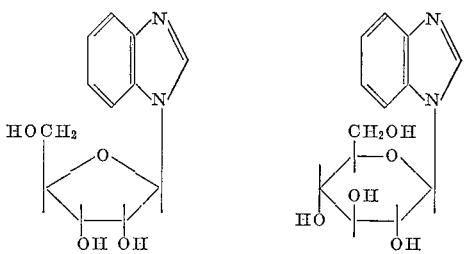

The preceding representative examples may be varied within the scope of the present total specification disclosure, as understood and practiced, to achieve essentially the same results.

What is claimed is:

1. 2,6,8-trichloro-9-(hepta-O-acetyl-β-D - cellobisyl)-purine.
2. 2,6,8-trichloro-9-(hepta-O-acetyl - β - gentiobisoyl)-purine.
3. In the preparation of nucleosides by condensing heterocyclic compounds, selected from the group consisting of purines, pyrimidines and benzimidazoles, and acyl glucosyl halides under liberation of hydrogen halide, the improvement which consists in carrying out the reaction in an anhydrous, inert solvent containing an acid acceptor for said liberated hydrogen halide, which acid acceptor is selected from the group consisting of the oxides of silver and mercury, the carbonates of silver and cadmium, and the cyanides of silver, mercury, cadmium, potassium, barium and zinc.
4. The method of claim 3, wherein the anhydrous inert solvent employed is selected from the group consisting of nitromethane, nitroethane and acetonitrile.
5. The method of claim 3, wherein the purine employed is a compound of the general formula:

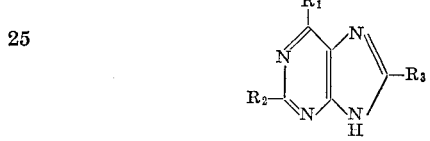

wherein $R_1$ and $R_2$ are each selected from the group consisting of hydrogen, chlorine, bromine, acetamido, dimethylamino, oxygen methylthio, benzamido, and methoxy, and $R_3$ is selected from the group consisting of hydrogen, chlorine and bromine.
6. The method of claim 3, wherein the purine employed is an N-methyl purine selected from the group consisting of theophilline and theobromine.
7. The method according to claim 3, wherein the pyrimidine compound employed is selected from the group consisting of N-acetyl-cytosine and 2-methylthio-4-chloro-6-pyrimidine.
8. The method of claim 3, wherein the benzimidazole compound employed is selected from the group consisting of benzimidazole and 5,6-dimethyl benzimidazole.
9. The method of claim 3, wherein the acylglycosyl halide employed is selected from the group consisting of the di-, tri- and tetra-O-acetyl- and di-, tri-, and tetra-O-benzoyl glycopyranosyl and ribofuranosyl chlorides and bromides, and their corresponding desoxy compounds.

References Cited by the Examiner

UNITED STATES PATENTS 2,852,505    9/1958   Baker et al. _____ 260—211.5
3,014,900   12/1961   Schroeder _____ 260—211.5

OTHER REFERENCES

Pigman: "The Carbohydrates," 1957, pp. 447–448, Academic Press Inc., 111 Fifth Avenue, New York 3, N.Y.

LEWIS GOTTS, *Primary Examiner.*

JULIAN S. LEVITT, *Examiner.*